United States Patent
Jacobson et al.

(10) Patent No.: US 10,912,257 B2
(45) Date of Patent: Feb. 9, 2021

(54) WRAP FEED ASSEMBLY FOR ROUND MODULE BUILDER

(71) Applicant: DEERE & COMPANY, Moline, IL (US)

(72) Inventors: Marcus A. Jacobson, Ankeny, IA (US); Jeffrey S. Wigdahl, Ames, IA (US)

(73) Assignee: DEERE & COMPANY, Moline, IL (US)

( * ) Notice: Subject to any disclaimer, the term of this patent is extended or adjusted under 35 U.S.C. 154(b) by 124 days.

(21) Appl. No.: 16/283,102

(22) Filed: Feb. 22, 2019

(65) Prior Publication Data
US 2020/0267905 A1    Aug. 27, 2020

(51) Int. Cl.
*A01F 15/07*    (2006.01)
*A01D 46/08*    (2006.01)

(52) U.S. Cl.
CPC .......... *A01F 15/0715* (2013.01); *A01D 46/08* (2013.01); *A01F 2015/077* (2013.01); *A01F 2015/0735* (2013.01); *A01F 2015/0755* (2013.01)

(58) Field of Classification Search
CPC .......... A01F 15/0715; A01F 2015/0755; A01F 2015/077; A01F 2015/0735; A01F 15/071; A01F 2015/076; A01F 2015/074; A01D 46/08
See application file for complete search history.

(56) References Cited

U.S. PATENT DOCUMENTS

| | | | | |
|---|---|---|---|---|
| 4,676,046 A * | 6/1987 | Verhulst | ............. | A01F 15/0715 53/118 |
| 4,969,315 A * | 11/1990 | Ardueser | ............. | A01F 15/0715 53/389.2 |
| 5,129,207 A * | 7/1992 | Butler | ................. | A01F 15/0715 53/118 |
| 5,129,208 A * | 7/1992 | Van Zee | ............. | A01F 15/0715 53/118 |
| 5,729,953 A * | 3/1998 | Fell | ..................... | A01F 15/0715 53/118 |
| 6,006,504 A * | 12/1999 | Myers | ................. | A01F 15/0715 53/556 |
| 6,050,052 A * | 4/2000 | Herron | ................ | A01F 15/0715 53/118 |
| 8,069,638 B2 * | 12/2011 | Wigdahl | ............. | A01D 46/084 53/587 |
| 10,440,894 B2 * | 10/2019 | Jacobson | ............ | A01F 15/0715 |
| 2004/0089167 A1 * | 5/2004 | Viaud | ................... | A01F 15/071 100/88 |

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A crop module builder including a module wrapping assembly configured to wrap a module with a wrap provided by a wrap roll. The crop module builder includes a floor including a plurality of belts configured to move the wrap from the wrap roll toward a front of the floor, wherein the floor includes a first position and a second position. A guiderod structure is operatively connected to the floor, wherein the guide rod structure is configured to move with movement of the floor. A mat is operatively connected to the floor and to the guide rod structure, wherein the mat spans a gap between the guide rod structure and the deck in the first position and in the second position.

19 Claims, 8 Drawing Sheets

(56) References Cited

U.S. PATENT DOCUMENTS

| | | | | |
|---|---|---|---|---|
| 2010/0024357 A1* | 2/2010 | Viaud | .................... | A01F 15/071 53/116 |
| 2010/0192516 A1* | 8/2010 | Olander | .............. | A01F 15/0715 53/399 |
| 2012/0073455 A1* | 3/2012 | Vandamme | ........... | B65B 27/125 100/35 |
| 2015/0047311 A1 | 2/2015 | Jacobson et al. | | |
| 2015/0305244 A1* | 10/2015 | Gresset | ................... | B65B 41/12 53/587 |
| 2016/0353664 A1* | 12/2016 | Weber | ..................... | A01F 15/18 |
| 2016/0353665 A1* | 12/2016 | Hummel | ............... | A01F 15/071 |
| 2016/0355292 A1* | 12/2016 | Wigdahl | ............ | A01F 15/0715 |
| 2019/0141901 A1* | 5/2019 | Hackert | ................. | A01F 15/18 53/582 |

\* cited by examiner

WRAP FEED ASSEMBLY FOR ROUND MODULE BUILDER

FIELD OF THE DISCLOSURE

The present disclosure is directed to a round module builder of a harvesting machine, and more particularly to a module wrap system having a wrap feed assembly to direct a wrap to cover the round module.

BACKGROUND OF THE DISCLOSURE

Round module builders or balers use belts and rollers to manipulate harvested material into a desired form. A round hay baler and a round module builder for cotton both typically use belts under tension running on a series of rollers to compact the harvested material into a cylindrical shape. The belts travel along the rollers to generate a forming chamber wherein the harvested material is collected and formed into the desired shape and density. Once the harvested material is formed to the desired size, a the round module builder delivers a wrap material into the forming chamber to wrap the module with the wrap material prior to ejecting the module from the forming chamber.

The wrap material is typically distributed from a wrap roll positioned adjacent to the forming chamber. The wrap roll is positioned on rollers and the wrap material is fed through the rollers to ultimately enter the forming chamber. At least one of the rollers is powered at a speed configured to stretch the wrap material as it spans from the rollers to the forming chamber. The wrap material moves along a floor or deck to the forming chamber wherein the direction of the wrap material is changed to direct a leading edge of the wrap material to the module. At a transition location between the floor and the forming chamber, the wrap can be misfed due to misalignment, deformation, or wear occurring to the parts located at the transition location. The misfeeding of the wrap, since it results in an improperly wrapped bale, requires service to the machine to correct the resulting problems. What is needed, therefore, is a module wrapping assembly for a module builder configured to reduce or eliminate wrap feeding problems at the transition location.

SUMMARY

In one embodiment there is provided a crop module builder including a module wrapping assembly configured to wrap a module with a wrap provided by a wrap roll. The crop module builder includes a floor having a plurality of belts configured to move the wrap from the wrap roll toward a front of the floor, wherein the floor includes a first position and a second position. A guiderod structure is operatively connected to the floor, wherein the guide rod structure is configured to move with movement of the floor. A mat is operatively connected to the floor and to the guide rod structure, wherein the mat spans a gap between the guide rod structure and the deck in the first position and in the second position.

In another embodiment, there is provided a cotton harvester configured to provide a cotton module. The cotton harvester includes a chassis, a harvesting structure operatively connected to the chassis and configured to remove cotton from a field, and a module wrapping assembly operatively connected to the harvesting structure configured to wrap the cotton module with a wrap provided by a wrap roll. The module wrapping assembly includes a floor spaced from a front gate roll, the floor configured to deliver the wrap to the front gate roll across a gap between an end of the floor and the front gate roll. The module wrapping assembly further includes a mat configured to direct a leading edge of the wrap toward the front gate roll.

In further embodiment, there is provided a method of wrapping a cotton module of a cotton harvester having a gate roll configured to direct belts to compress cotton into the cotton module, a guide rod assembly spaced from the gate roll, and a floor configured to move the module wrap. The method includes: providing a mat fixedly connected to the floor and slidably connected to the guide rod assembly; moving the floor from a first position to a second position; and when the floor is in the second position, moving the wrap along the floor, across the mat, and between the guide rod assembly and the front gate roll.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
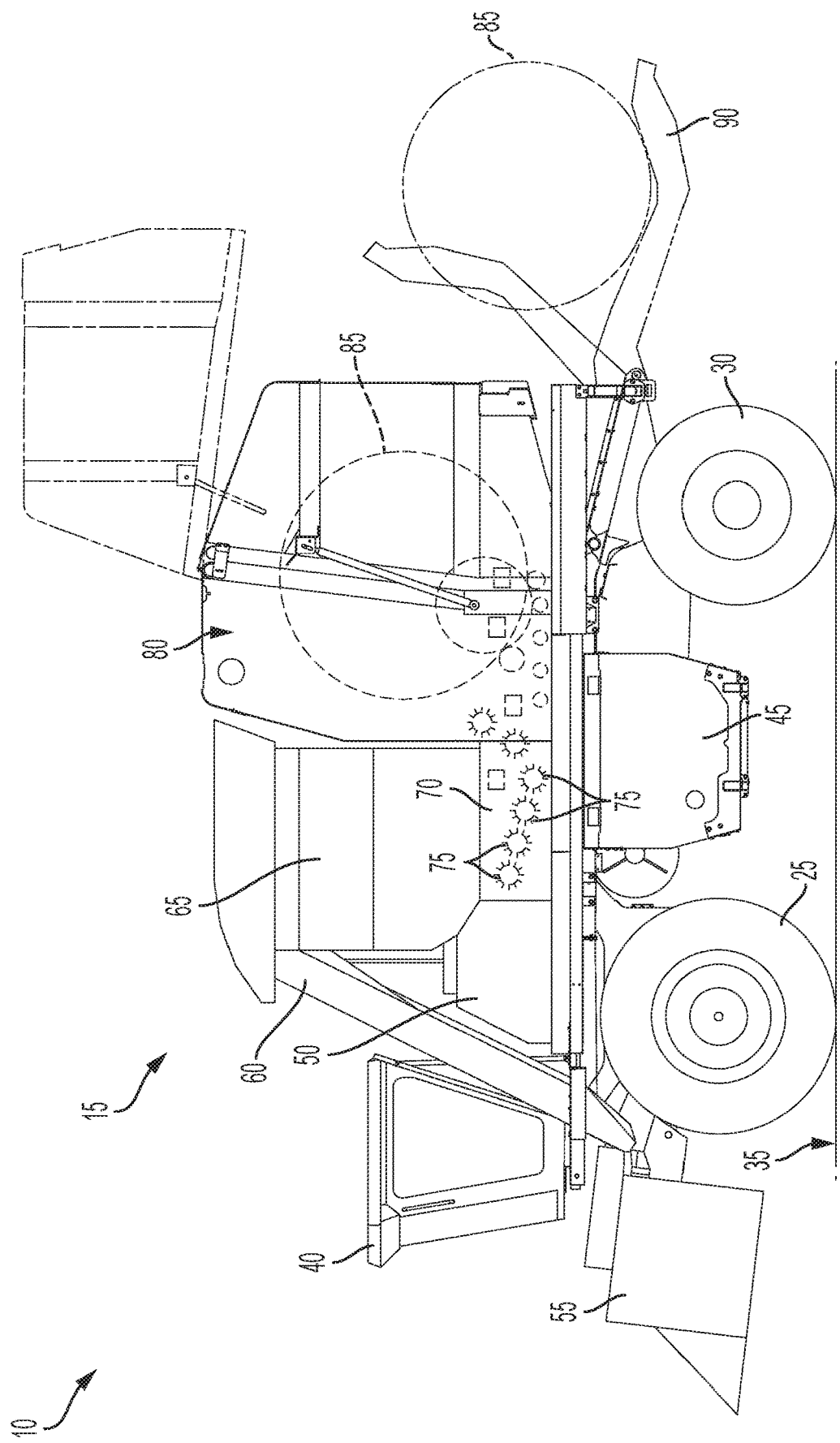
FIG. 1 is a side view of a cotton harvester.

FIG. 1 illustrates a conventional harvester 10 according to one embodiment. The illustrated harvester 10 is a cotton harvester 15. Alternatively, the harvester 10 may be any type of work machine that utilizes a wrapping assembly.

The harvester 10 includes a chassis 20. The chassis 20 is supported by front wheels 25 and rear wheels 30. The harvester 10 is adapted for movement through a field 35 to harvest cotton or other crops. An operator station 40 is supported by the chassis 20. A power module 45 may be supported below the chassis 20. Water, lubricant, and fuel tanks, indicated generally at 50, may be supported on the chassis 20.

A harvesting structure 55 is operatively connected to the chassis 20. The illustrated harvesting structure 55 is configured to remove cotton from the field 35. Alternatively, the harvesting structure 55, in other embodiments, is configured to remove other crop. An air duct system 60 is operatively connected to the harvesting structure 55. An accumulator 65 is operatively connected to the air duct system 60. The accumulator 65 is configured to receive cotton, or other crop, from the harvesting structure 55 via the air duct system 60. A feeder 70 is operatively connected to the chassis 20. The feeder 70 is configured to receive cotton, or other crop, from the accumulator 65. The feeder 70 includes a plurality of rollers 75 configured to compress the cotton, or other crop, and transfer the cotton, or other crop, to a round module builder 80.

While a round module builder 80 is shown and described as part of a cotton harvester 15, this disclosure is not limited to such an application of a module builder. More specifically, other embodiments considered for this disclosure include, but are not limited to, a pull type round baler. A pull type round baler may not include a chassis, header, air system, and other components shown on the cotton harvester 15. Rather, the pull behind round baler may have a hitch, wheels, and a crop pickup assembly coupled to the round module builder. A person having skill in the relevant art understands how the teachings of this disclosure can be applied to any round-type baler or module builder and this disclosure is not limited in application to the cotton harvester 15 shown and described herein. After a round module 85 is formed and wrapped, a module handling system 90 receives the round module 85. The module handling system 90 temporarily supports the round module 85 above the ground 35 and then discharges it from the harvester 10.

Figure 2:
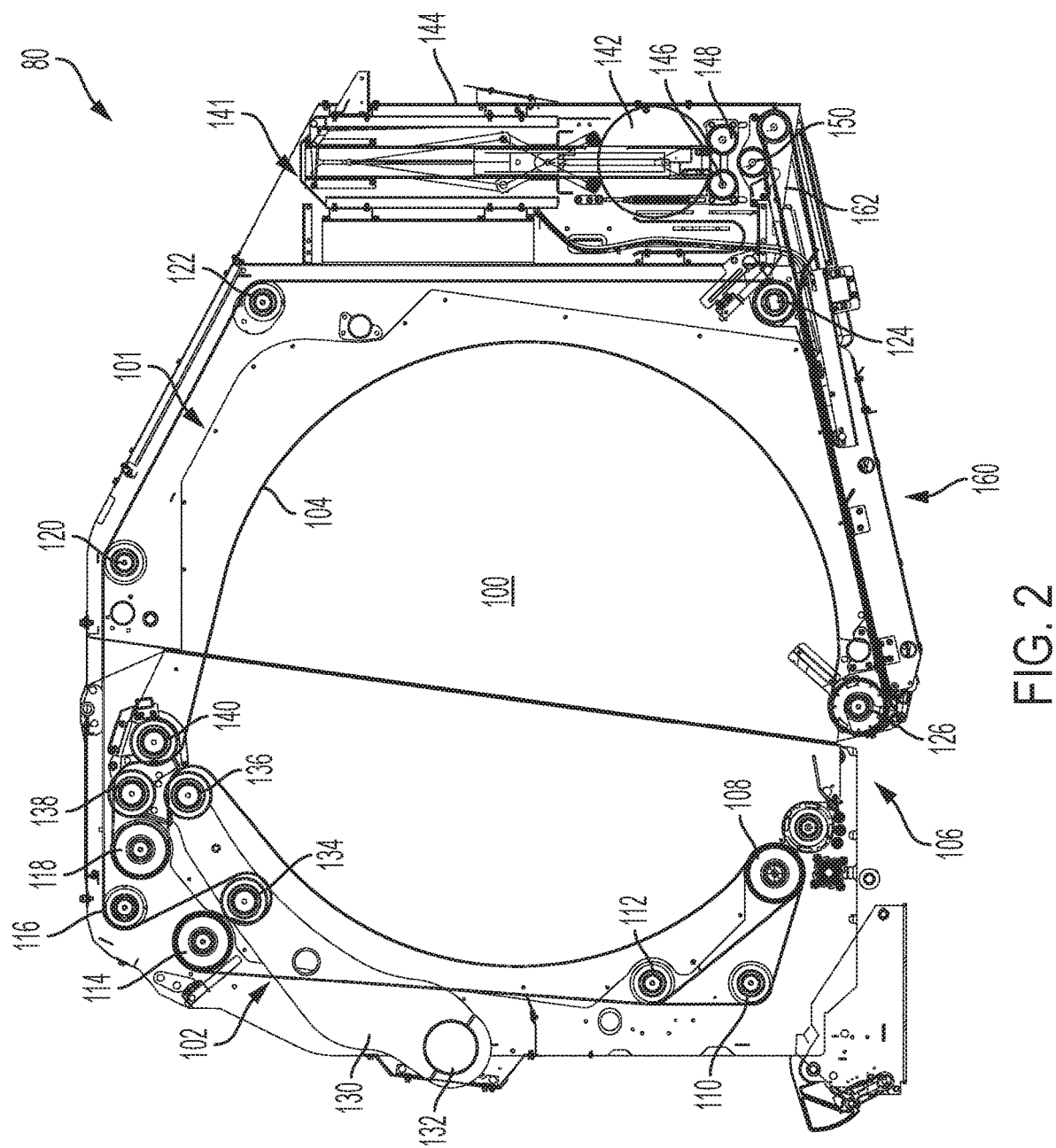
FIG. 2 is a cross-sectional side view of a round module builder.

Referring to FIG. 2, the module builder 80 includes a module-forming chamber 100 including a plurality of belts 104 defining a circumference of the module-forming chamber 100. The module forming chamber 100 is defined by a rear portion 101 and a front portion 102. Once the bale 85 is formed, the rear portion 101 swings out and away from the front portion 102 to release the bale 85 to the module handling system 90.

The plurality of belts 104 are supported in a side-by-side relationship across a support roll arrangement comprising a plurality of fixed rolls and a plurality of movable rolls. Specifically, proceeding clockwise from a chamber inlet 106, where crop enters the module-forming chamber 100, the fixed rolls include a lower drive roll 108, a first separation roll 110, a second separation roll 112, an upper drive roll 114, an upper front frame roll 116, an upper rear frame roll 118, an upper front gate roll 120, an upper rear gate roll 122, a lower rear gate roll 124, and a lower front gate roll 126, all coupled for rotation within the round module builder 80.

In FIG. 2, a conventional pair of transversely spaced belt tensioning or rockshaft arms 130 are pivotally mounted to a belt tensioning arm pivot 132. The plurality of movable rolls comprise a first movable roll 134, a second movable roll 136, a third movable roll 138, and a fourth movable roll 140, which extend between and have opposite ends, respectively, rotatably coupled to the transversely-spaced belt tensioning arms 130. As illustrated, one or more of the fixed rolls are driven to cause the plurality of belts 104 to be driven, with the drive direction being such as to cause the incoming cotton, or other crop, to travel counterclockwise as illustrated, and added as a spiral layer to a growing round module 85. As the round module 85 expands within the module-forming chamber 100, the transversely spaced belt tensioning arms 130 rotate counterclockwise until a round module 85 having a predetermined diameter has been formed in the module-forming chamber 100.

Along the rear portion of the round module builder 80 may be a wrapping assembly 141 that houses one or more wrap rolls 142. In the embodiment illustrated in FIG. 2, only one wrap roll 142 is shown positioned in the wrapping assembly 141. However, the wrapping assembly 141 is configured to stack multiple wrap rolls 142 on top of one another within a wrap roll hopper 144. The bottom most wrap roll 142 rests on a front carry roller 146 and a rear carry roller 148. The front and rear carry rollers 146, 148 are coupled to a bracket (not shown) that allows the front and rear carry rollers 146, 148 to move along a linear path towards, and away from, a lower wrap roller 150.

The wrap roll 142 includes a wrap material sized to cover the exterior circumference of the round module 85, as it is being formed in the chamber 100. The wrap material transitions from the wrap roll 142, partially around the front carry roller 146, between the front carry roller 146 and the lower wrap roller 150, and partially around the lower wrap roller 150. The wrap is delivered to the lower front gate roll 126. The lower front gate roll 126 rotates about a longitudinal axis as the belts move in the module forming chamber 100. Once the wrap material enters the module forming chamber 100 at the lower front gate roll 126, the wrap material follows the belts 104 about the circumference of the round module 85 until the outer surface of the module is substantially covered with wrap material. An assembly (not specifically shown) then severs the wrap material from the wrap roll 142. The wrap material adheres to the round module 85 to substantially maintain its form once ejected from the module forming chamber 100.

In one aspect of the wrapping assembly 141 illustrated in FIG. 2, the wrap material is stretched as it extends between the lower wrap roller 150 and the lower front gate roll 126. More specifically, one or more of the front and rear carry rollers 146, 148 and the lower wrap roller 150 are powered to feed wrap material from the wrap roll 142 to the module forming chamber 185. Further, the wrap material may be pinched between the front and rear carry rollers 146, 148 and the lower wrap roller 150 as it is fed from the wrap roll 142 to the module forming chamber 100.

The powered rollers 146, 148, 152 move the wrap material toward the lower front gate roll 126 at a feed speed. The feed speed may be slightly less than the speed required to match the rotation speed of the round module 85. In one non-limiting example, the round module includes a twenty-three foot circumference and thereby requires approximately twenty-three linear feet of wrap material per rotation. However, the wrapping assembly 141, in one embodiment, only has a feed speed of twenty-two linear feet per rotation. In this embodiment, as the wrap material transitions from the wrap roll 142 to the module forming chamber 100, the wrap material is stretched as it moves between the lower wrap roller 150 and the lower front gate roll 126.

Stretching the wrap material as it transitions from the wrapping assembly 141 to the module forming chamber 100 provides for a tightly packed round module 85 that has a high density and therefor transports a large amount of harvested crop. Further, the wrap material compresses the round module 85 so that it maintains the proper form. Properly covering the outer surface of the round module 85 also limits or inhibits moisture from penetrating into outer surface of the round module 85. However, if the wrap material is not evenly distributed about the outer surface, or is misfed, the round module 85 may lose form and fall apart or become saturated with water or the like.

In operation, the harvester 10 is driven through the field 35 to harvest cotton or other crop. The illustrated harvesting structure 55 picks cotton from cotton plants in the field 35. Alternatively, the harvesting structure 55 strips the cotton from the cotton plants. Cotton is transferred to the accumulator 65 via the air duct system 60. The accumulator 65 holds the cotton until a predetermined cotton level is reached and then transfers the cotton to the feeder 70. In an exemplary embodiment, the accumulator 65 transfers cotton to the feeder 70 approximately four times for each round module 85 produced. When the feeder 70 receives cotton, the plurality of rollers 75 are activated to compress the cotton. The compressed cotton is transferred to the round module builder 80.

After the round module builder 80 receives compressed cotton, the plurality of belts 104 rotate the cotton into the round module 85. After the round module builder 80 receives sufficient cotton from the feeder 70, the round module is wrapped and the round module 85 is ejected onto the module handling system 90. The module handling system 90 supports the round module 85 and then discharges it from the harvester 10.

A wrap floor 160 is positioned partially between the lower wrap roller 150 and the front gate roll 126. The wrap floor 160 includes, in different embodiments, a plurality of continuous belts 162 or the like positioned thereon. The belts 162 and the wrap floor 160 guide the wrap material, in part, from the wrap roll 142 to the lower front gate roll 126 and ultimately into the module forming chamber 100.

Figure 3:
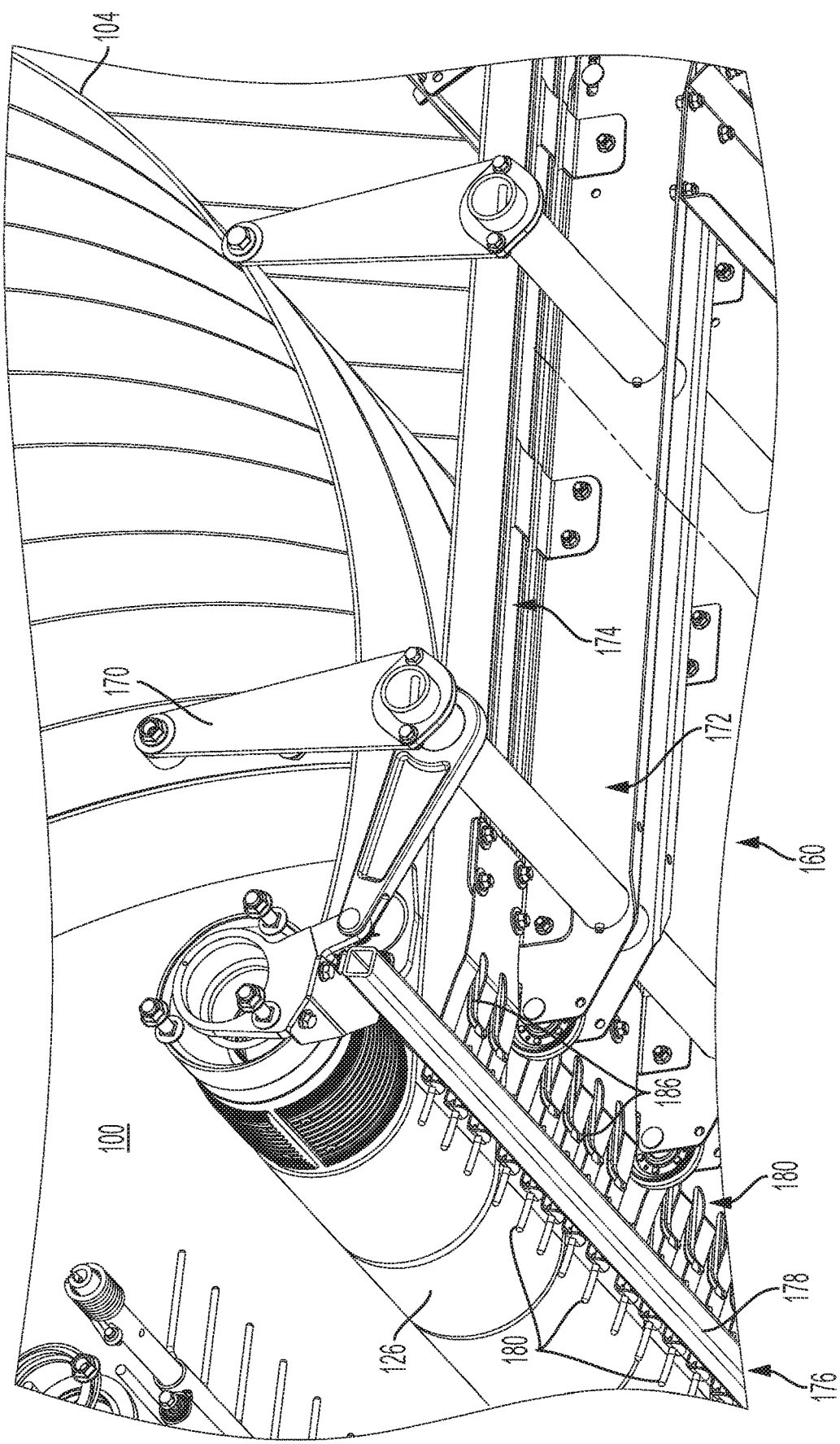
FIG. 3 is a partial perspective view a wrapping assembly.
Figure 4:
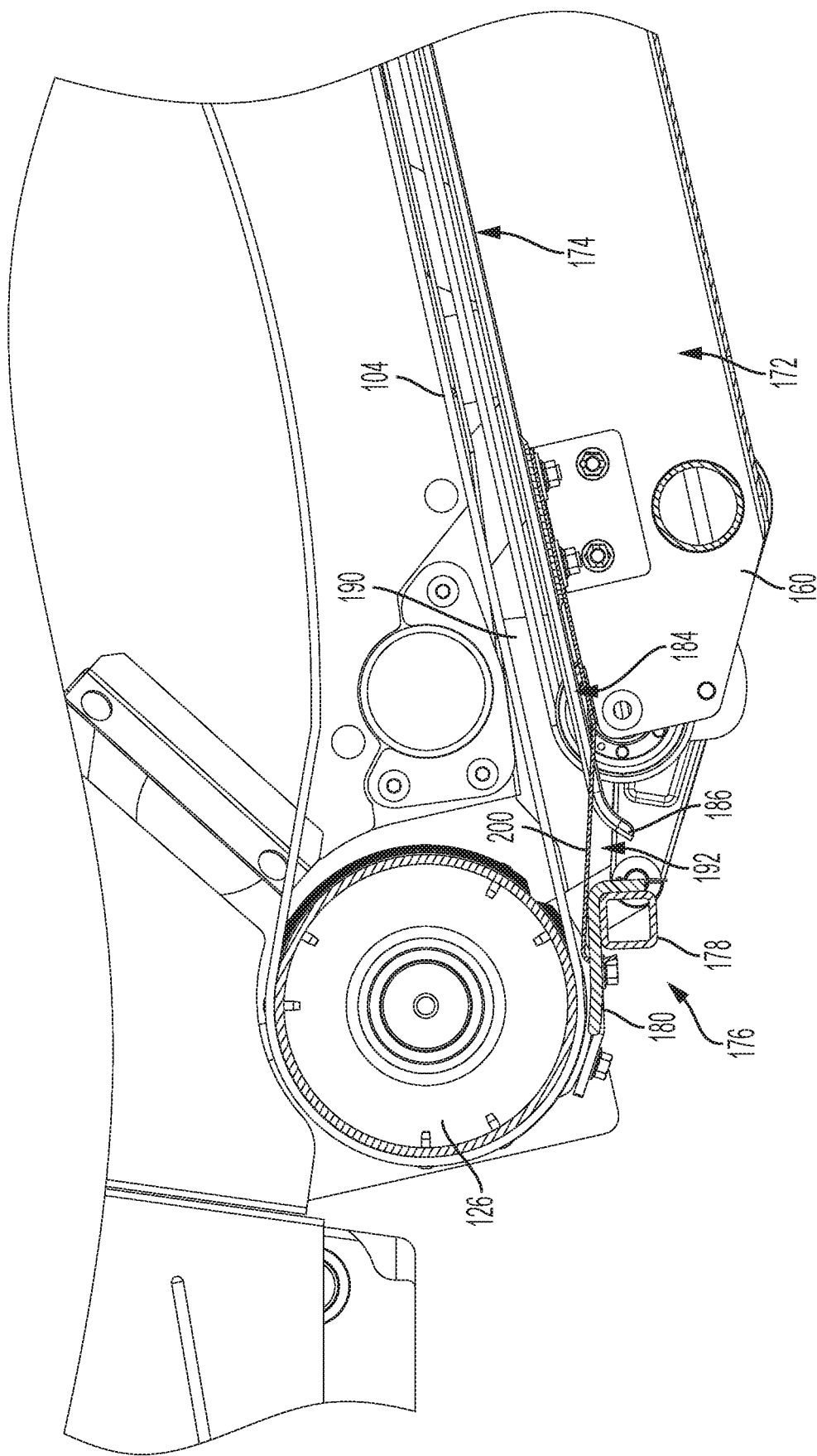
FIG. 4 is a partial side view of a floor of a wrapping assembly in a first position.
Figure 5:
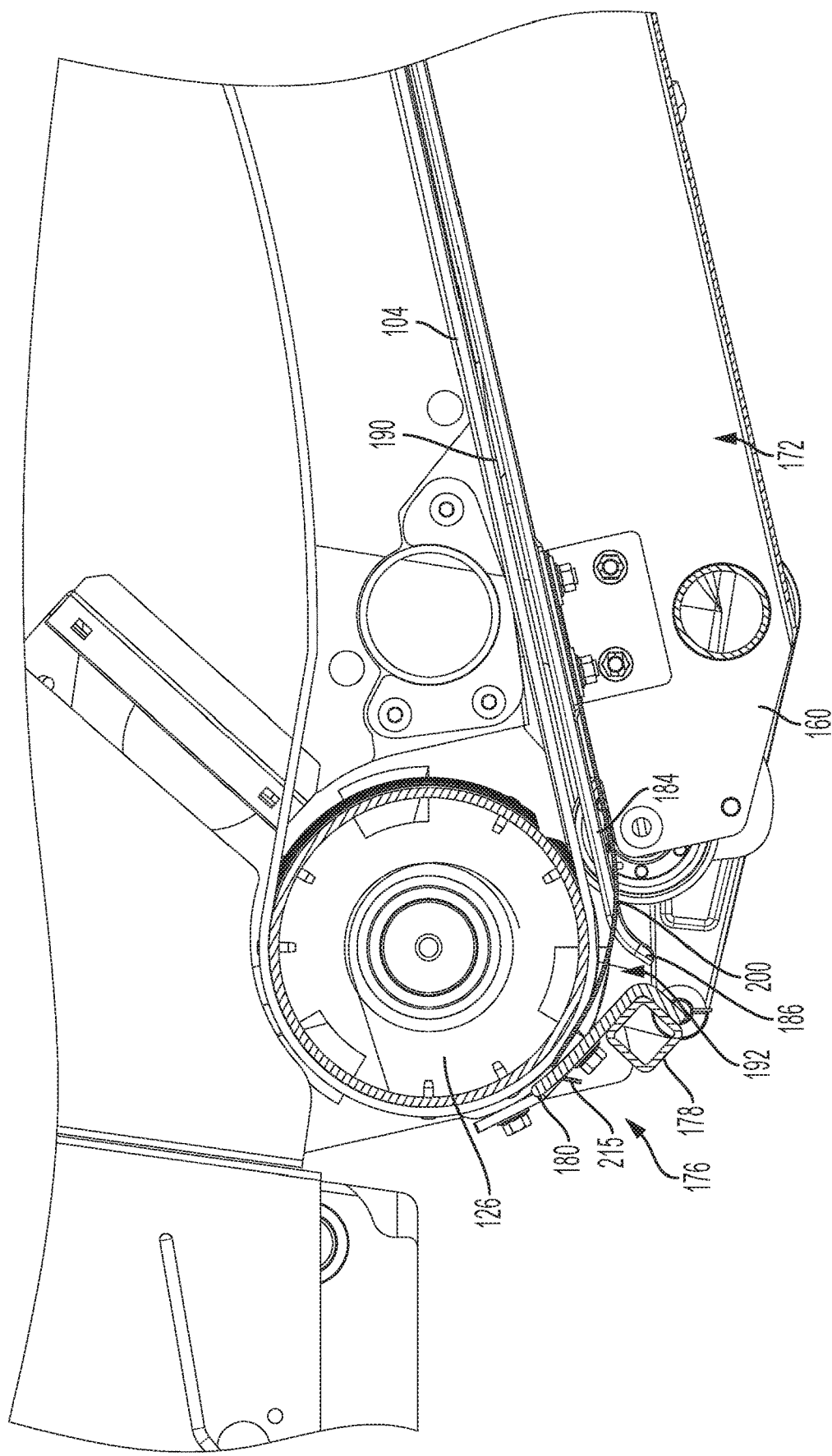
FIG. 5 is a partial side view of a floor of a wrapping assembly in a second position.

As further illustrated in FIG. 3, a four bar linkage 170 is operatively connected to the wrap floor 160. The four bar linkage is not illustrated in FIG. 2. The four bar linkage 170 is configured to adjust the position of the wrap floor 160 with respect to the front gate roll 126 for directing the wrap (not shown) past the front gate roll 126 and around the round module 85 being formed. The wrap floor 160 is located in a first position as illustrated in FIG. 4 and is moved to a second position as illustrated in FIG. 5. In FIG. 4, the wrap floor 160 is spaced from the gate roll 126 and in FIG. 5 the wrap floor is moved closer to the gate roll 126 to enable the gate roll 126 to direct the wrap around the bale being formed. The four bar linkage 170 is not illustrated in these FIGS. 4 and 5.

The wrap floor 160 includes a frame structure 172 that supports a floor 174 upon which, or through which, the belts 162 move. A guide rod structure 176 is operatively connected to the frame structure 172 and is rotatably fixed with respect to the gate roll 126. The guide rod structure 176 includes a shaft 178 extending from one side of the module forming chamber 100 to another side of the module forming chamber 100 and is substantially equal to or greater than the width of the module 85 being formed in the chamber 100. In other embodiments, the shaft 178 includes a square tube which is either hollow or which is solid. Other configurations of the shaft 178 are contemplated. A plurality of rods 180 are fixedly coupled to the shaft 178. Each of the rods 180 includes a bend which directs the free ends of the rods 180 toward the gate roll 126. Each of the rods 180 extends generally perpendicular to a longitudinal axis of the shaft 178, which extends along a rotating axis of the gate roll 126. Other embodiments are contemplated and include rods 180 that are substantially straight. In the illustrated figure, the rods 180 are regularly spaced such that there is an equal amount of space between each of the rods with respect to an adjacent rod. Other spacings of rods are contemplated.

A wrap floor guide 184 are located along the floor 174 and includes a plurality of extenders 186 that extend from the floor 174. In different embodiments, the extenders 186 are formed as a part of the floor 174 or are formed as a separate part fixedly coupled to the floor 174. Each of the extenders 186 includes a bend which directs the free ends of the extenders 186 downward and away from the gate roll 126. Other embodiments are contemplated. In the illustrated figure, the extenders 186 are regularly spaced such that there is an equal amount of space between each of the extenders with respect to an adjacent extender. Other spacings of extenders are contemplated.

As illustrated in FIG. 4, in a first position of the floor 174, a gap 190 is located between the floor 174 and the belt 104. As illustrated in FIG. 5, the gap 190 is reduced in size as the four bar link 170 moves the floor 174 closer to the belt 104. In this condition of FIG. 4, the wrap moves from the roll 142 in response to movement of the rolls 146, 148, and 150, along the length of the floor 174 and toward the roller 126. As the leading edge of the wrap moves toward the end of the floor 174, the wrap reaches a transition location 192 located between the extenders 186 and the guide rod structure 176. A mat 200 is operatively connected to the floor 160 and to the guide rod structure 176. As the leading edge of the wrap moves from the floor 160 to the roll 126, the mat 200 directs and provides a support surface for the wrap across the transition location 192.

Figure 6:
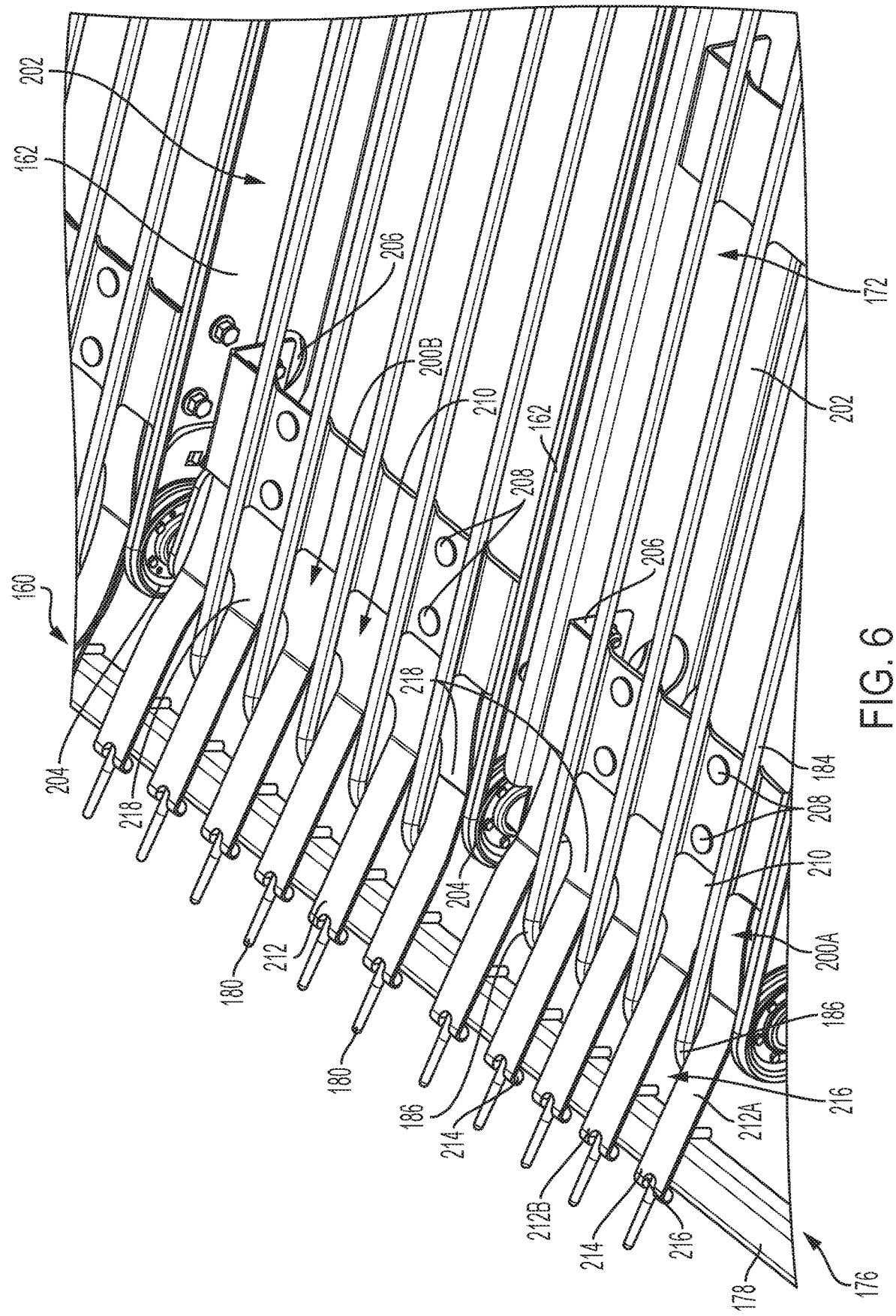
FIG. 6 is a perspective top view of a portion of a wrap floor including a frame structure and a wrap directing mat.

FIG. 6 illustrates a perspective top view of a portion of the wrap floor 160 including the frame structure 172. The frame structure 172 includes a plurality of supports 202 each of this supports a pulley 204 upon which one of the belts 162 is located. As the wrap is pulled from the roll 142, the belts 162 move the wrap toward the mat 200. In this illustrated embodiment, the mat 200 includes a plurality of mat parts, two of which, mat part 200A and 200B are illustrated. Each of the mats 200 is fixedly coupled to a crosspiece 206 which in turn is fixedly coupled to adjacent supports 202. The crosspieces 206 includes a relatively planar top surface to which the mat 200 is fixed. In one embodiment, the mat 200 is fixed to the crosspiece 206 by a plurality of connectors 208. In one embodiment, the connector 208 includes a carriage bolt, a nut, and a washer.

Figure 7:
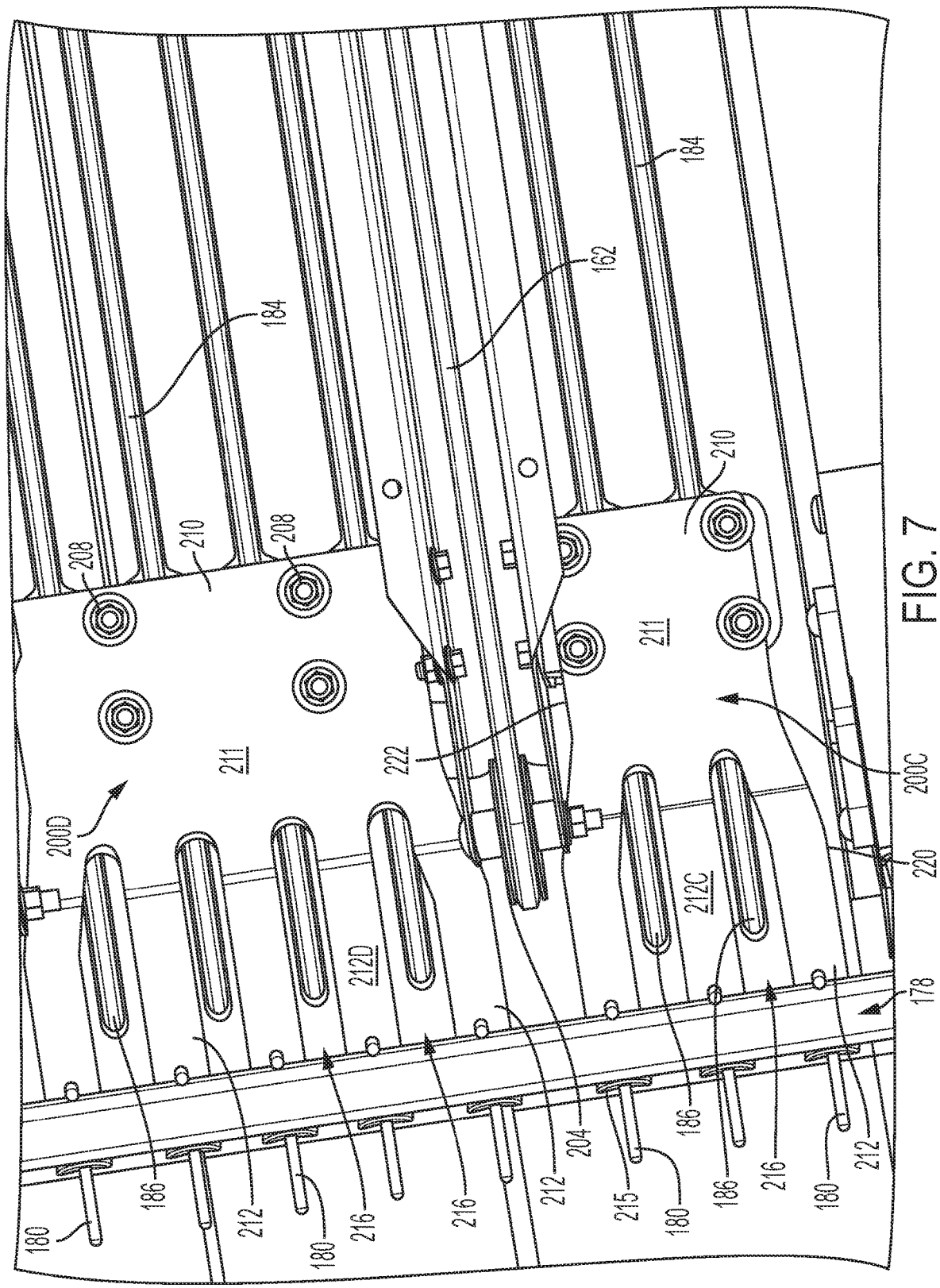
FIG. 7 is a bottom view of a floor including a bottom view of wrap directing mats.

FIG. 7 illustrates a bottom view of the floor 160 including a bottom view of the mats 200. Each of the mats 200 include a base portion 210 and a plurality of fingers 212 extending from the base portion 210. The base portion 210 includes a width extending between adjacent supports 202 and the fingers 212 extend along the moving direction of the belts 162. In one embodiment, a plate 211, made of a rigid material such as a metal, is located on the base portion 210 of the mat 200 to secure the mat 200 to the crosspiece 206.

As seen in FIGS. 6 and 7, each of the fingers 212 includes a terminating end 214 operatively connected to one of the rods 180. In one embodiment, the terminating end 214 of the finger 212 includes an aperture 216, configured as a slot, through which the rod 180 extends, and a bent or curved portion or end 215. The portion 215 is configured to substantially prevent the terminating end 214 from being displaced from the rod 180 during production of the module 85.

Adjacent fingers 212, such as fingers 212A and 212B are separated by a space 216 sufficient to accommodate the extender 186 located therebetween. Consequently, as the wrap moves along the floor guide 184 toward the roll 126, the leading edge of the wrap contacts the fingers 212 and moves along the fingers 212 of the mat 200 until the leading edge is moved by the roll 126 into contact with the module 85. As illustrated, the space 216 between the fingers extends from the base portion to the terminating ends 214. In other embodiments, the space 216 extends from the base 210 but does not extend to the terminating ends 214. In this embodiment, each of the terminating ends 214 is connected to an adjacent terminating end 214, such that space 216 is a slot.

As seen in the bottom view of FIG. 7, the base 210 is generally rectangular and the fingers 212 extend from the base. A first edge 220 and a second edge 222 extend generally longitudinally along the extenders, but include a curve to accommodate the rods 180 which are displaced from the extenders 186 along the longitudinal direction. Fingers 216 located between the fingers located at the edges of the base 210, such as fingers 212C and 212D that include edges that are generally linear.

In different embodiments and as seen in FIGS. 6 and 7, each of the mats 200 includes a plurality of fingers 216 based on a width of the mat 200. For instance, the mat 200C includes three fingers 212, and the mat 200D includes five fingers 212. Each of the fingers 212 includes a bend line 218, a location at which the finger 212 is configured to bend as the mat transitions from the base 210 to the terminating end 214. By including the bend line 218 at substantially the same location on each finger 212, the entire leading edge of the wrap is directed along a substantially similar path to engage the module 85.

Figure 8:
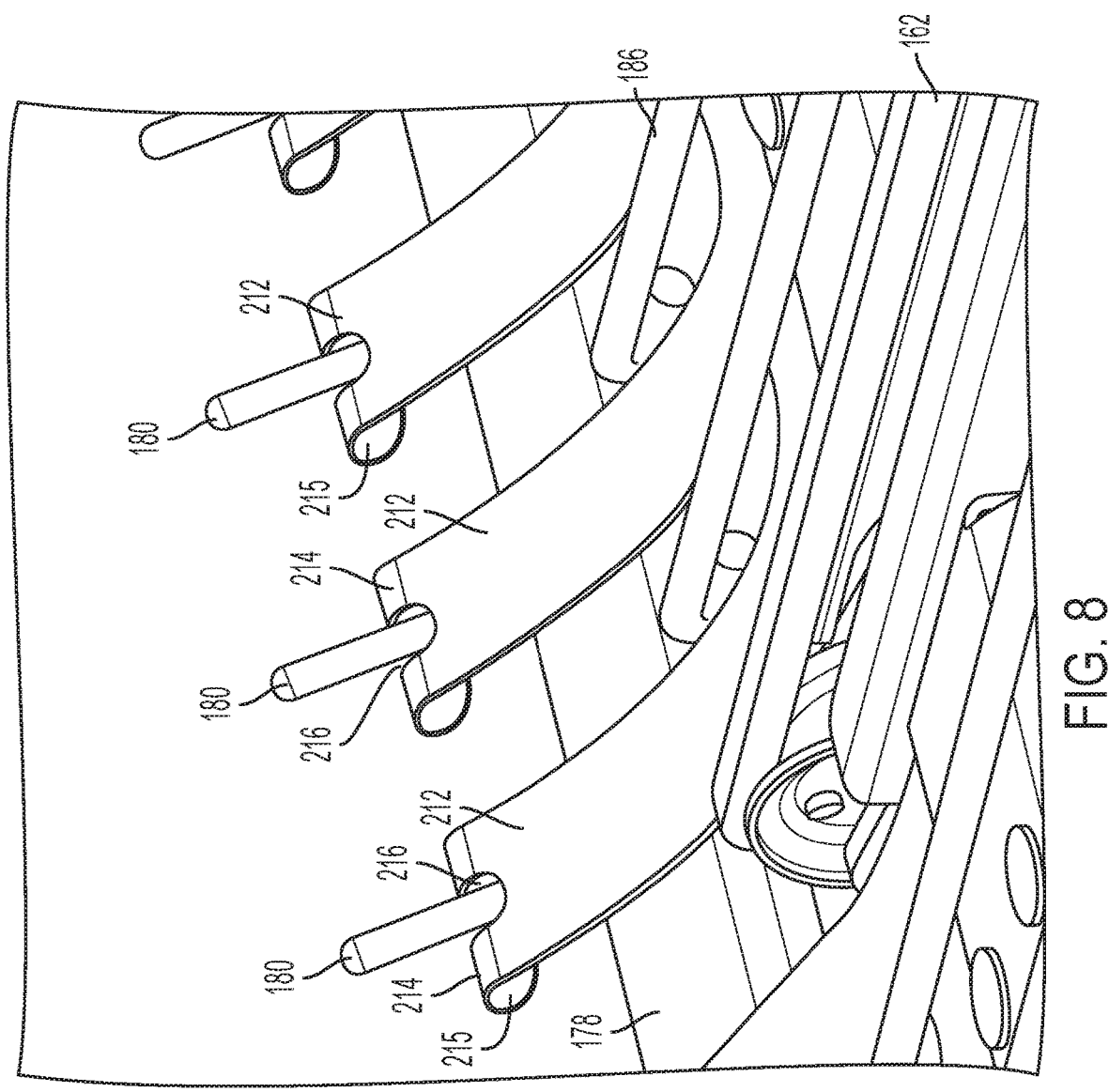
FIG. 8 is perspective view of fingers of a wrap directing mat.

As previously described in FIG. 5, the floor 160 is moved by the four bar linkage 170 toward the roll 126 to engage the wrap with the module 85. Referring to FIG. 8, as the floor 160 moves toward the roll 126, the terminating ends 214 of the fingers 212 move toward the ends of the rods 180. The length of the fingers 212 is sufficient to accommodate the movement of the floor 160 with respect to the roll 126 from the position of FIG. 4 to the position of FIG. 5. As seen in FIG. 4, the position of the floor 160 locates the curved portion 215 of the fingers 212 relatively close to the shaft 178. When floor 160 moves to the location of FIG. 5, the fingers 212 move along the rods 180 such that the curved portion 215 is spaced further from the shaft than as illustrated in FIG. 4. Please see FIG. 8 illustrating the locations of the fingers 212 with respect to the shaft 178 when the floor is in the position of FIG. 5.

In one embodiment, the mat 200 is made of a flexible material such as Nylon 6 (Polycaprolactam). Other types of plastic materials are contemplated. In addition, other materials are contemplated including metals. In these and other embodiments, the material forming the mat 200 includes a flexible material sufficient to withstand the repetitive movement of the floor 160 with respect to the belts on roll 126 as well as the guide rods 180. The flexible material is elastic and resilient and includes a thickness selected to bend with movement of the floor. The flexible material, however, requires a predetermined amount of stiffness to ensure that the fingers move along the rods 180 and to not buckle.

The incorporation of the mats including fingers as described herein, reduces or eliminates broken or bent parts that can cause obstructions for feeding the wrap. Consequently, the present invention reduces the amount of maintenance required.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A crop module builder including a module wrapping assembly configured to wrap a module with a wrap provided by a wrap roll, the crop module builder comprising:

a floor including a plurality of belts configured to move the wrap from the wrap roll toward a front of the floor, wherein the floor includes a first position and a second position;

a guide rod structure operatively connected to the floor and being spaced from the floor at a transition location, wherein the guide rod structure is configured to move with movement of the floor wherein a size of the space, at the transition location, changes from the first position to the second position of the floor; and a mat operatively connected to the floor and to the guide rod structure, wherein the mat spans the space at the transition location between the guide rod structure and the floor in both the first position and in the second position.

2. The module wrapping assembly of claim 1 wherein the guide rod structure includes a plurality of rods extending from a guide rod shaft and the mat is fixedly connected to the floor and is slidingly connected to the rods, wherein movement of the floor adjusts a position of the mat with respect to the rods.

3. The module wrapping assembly of claim 2 further comprising a gate roll and a plurality of wrap belts directed by the gate roll, wherein the gate roll is spaced from the floor by the space at the transition location and the mat extends across the space at the transition location from the floor to the guide rod shaft.

4. The module wrapping assembly of claim 3 wherein the mat includes a base portion and a plurality of fingers extending from the base portion, wherein the base portion is fixedly connected to the floor and each of the plurality of fingers is configured to extend across the space at the transition location and to engage one of the plurality of rods.

5. The module wrapping assembly of claim 4 wherein each of the plurality of fingers includes a terminating end defining an aperture, wherein one of the plurality of rods extends through the aperture.

6. The module wrapping assembly of 5 wherein the terminating end includes a curve configured to maintain the position of the finger along the rods during movement of the floor with respect to the gate roll.

7. The module wrapping assembly of claim 5 wherein the aperture includes a slot configured to engage the rod.

8. The module wrapping assembly of claim 5 wherein the mat comprises a flexible material.

9. The module wrapping assembly of claim 5 further comprising a plate wherein the plate fixedly couples the mat to the floor.

10. A cotton harvester configured to provide a cotton module, the cotton harvester comprising:

a chassis;

a harvesting structure operatively connected to the chassis and configured to remove cotton from a field;

a module wrapping assembly operatively connected to the harvesting structure configured to wrap the cotton module with a wrap provided by a wrap roll, the module wrapping assembly including a floor spaced from a front gate roll, the floor configured to deliver the wrap to the front gate roll across a space at a transition location between an end of the floor and the front gate roll, wherein the module wrapping assembly further includes a mat configured to direct a leading edge of the wrap toward the front gate roll, and a linkage operatively connected to the floor to move the floor between a first position and a second position; and a guide rod structure operatively connected to the floor and to the front gate roller, the guide rod structure being responsive to movement of the floor from the first position to the second position, and the mat is fixedly connected to the floor and movably connected to the guide rod structure, wherein the mat extends from the guide rod structure across the space at the transition location and between the guide rod structure and the floor in both the first position and in the second position.

11. The cotton harvester of claim 10 wherein the guide rod structure includes a plurality of rods extending from a guide rod shaft and the mat is slidingly connected to the rods, wherein movement of the floor adjusts a position of the mat with respect to the rods.

12. The cotton harvester of claim 11 wherein the mat includes a base portion and a plurality of fingers extending from the base portion, wherein the base portion is fixedly connected to the floor and each of the plurality of fingers is configured to extend across the space at the transition location and to engage one of the plurality of rods.

13. The cotton harvester of claim 12 wherein each of the plurality of fingers includes a terminating end defining an aperture, wherein one of the plurality of rods extends through the aperture.

14. The cotton harvester of 13 wherein the terminating end includes a curve configured to maintain the position of the finger along the rods during movement of the floor with respect to the gate roll.

15. The cotton harvester of claim 13 wherein the aperture includes a slot configured to engage the rod.

16. The cotton harvester of claim 13 wherein the mat comprises a flexible material.

17. The cotton harvester of claim 13 further comprising a plate wherein the plate fixedly couples the mat to the floor.

18. A method of wrapping a cotton module of a cotton harvester having a gate roll configured to direct belts to compress cotton into the cotton module, a guide rod assembly spaced from the gate roll, and a floor configured to move the module wrap, the method comprising:

providing a mat fixedly connected to the floor and slidably connected to the guide rod assembly;

moving the floor from a first position to a second position; and when the floor is in the second position, moving the wrap along the floor, across the mat, and between the guide rod assembly and the gate roll.

19. The method of claim 18 wherein the moving the floor from the first position to the second position further includes slidably moving the mat along the guide rail assembly.

* * * * *